(12) United States Patent
Olbrich et al.

(10) Patent No.: US 7,144,493 B2
(45) Date of Patent: Dec. 5, 2006

(54) PROCESS FOR THE ELECTROCHEMICAL DECOMPOSITION OF POWDERS AND ELECTROLYSIS CELLS SUITABLE THEREFOR

(75) Inventors: Armin Olbrich, Seesen (DE); Juliane Meese-Marktscheffel, Goslar (DE); Gerhard Gille, Goslar (DE); Viktor Stoller, Bad Harzburg (DE); Wolfgang Mathy, Langelsheim (DE)

(73) Assignee: H.C. Starck GmbH (DE)

( * ) Notice: Subject to any disclaimer, the term of this patent is extended or adjusted under 35 U.S.C. 154(b) by 279 days.

(21) Appl. No.: 10/413,958

(22) Filed: Apr. 15, 2003

(65) Prior Publication Data

US 2003/0196902 A1 Oct. 23, 2003

(30) Foreign Application Priority Data

Apr. 17, 2002 (DE) ................. 102 16 944

(51) Int. Cl.
C25F 7/00 (2006.01)
C25C 1/06 (2006.01)
C25C 1/08 (2006.01)
C25C 1/10 (2006.01)
C25B 1/00 (2006.01)

(52) U.S. Cl. ............... 205/771; 205/508; 205/704; 205/564; 205/572; 204/278.5

(58) Field of Classification Search .......... None
See application file for complete search history.

(56) References Cited

U.S. PATENT DOCUMENTS 1,462,421 A * 7/1923 Pearson ............... 205/560
3,972,795 A   8/1976 Goens et al. ............. 204/269
4,350,576 A * 9/1982 Watanabe et al. ........ 205/551
4,597,842 A   7/1986 Evans ...................... 204/130
4,718,939 A * 1/1988 Hilliard .................... 75/353

FOREIGN PATENT DOCUMENTS

| DE | 2650474 | 5/1978 |
| DE | 142896 | 7/1980 |
| GB | 1565181 | 4/1980 |
| SU | 2039710 | 7/1991 |

OTHER PUBLICATIONS

Kenworthy, V.A. et al., "Experimental Extraction of Strategic Components from S-816 Alloy Scrap Metal." Report of Investigations 5786. United States Department of the Interior. 1976.

(Continued)

Primary Examiner—Harry D. Wilkins, III
(74) Attorney, Agent, or Firm—Connolly Bove Lodge & Hutz

(57) ABSTRACT

Process for the electrochemical decomposition of precursors in powder form by introducing a powder batch between two electrodes of an electrolysis cell, electrodes being designed to be liquid-permeable, and the electrolyte flowing through the powder batch perpendicularly to the electrode surfaces, and electrolysis cell suitable therefor, which is essentially characterized in that at least one electrode has a structure which consists of a supporting pierced plate (5), an electrode plate (3) provided with perforations, and a filter cloth (4) arranged between the supporting pierced plate (5) and the electrode plate (3), and in that the cathode (6) is shielded from the cell by means of a liquid-permeable separator (7).

14 Claims, 1 Drawing Sheet

OTHER PUBLICATIONS

Vadasdi, K., "Effluent-Free Manufacture of Ammonium Paratungstate (APT) by Recycling Byproducts." Int. J. of Refractory Metals & Hard Materials 13 (1995) 45-49.

Venkatachalam, S., "Electrochemical Dissolution of Nickel from a Superalloy Scrap by Alternating Current." J. Electrochem. Soc. India, 127-131.

* cited by examiner

PROCESS FOR THE ELECTROCHEMICAL DECOMPOSITION OF POWDERS AND ELECTROLYSIS CELLS SUITABLE THEREFOR

CROSS REFERENCE TO RELATED PATENT APPLICATION

The present patent application claims the right of priority under 35 U.S.C. § 119 (a)–(d) of German Patent Application No. 102 16 944.6, filed Apr. 17, 2002.

FIELD OF THE INVENTION

The present invention relates to a process for the electrolytic decomposition of precursors in powder form, and in particular high-melting alloys such as rhenium/tungsten alloys, rhenium/molybdenum alloys, rhenium/molybdenum/tungsten alloys, superalloys, and alloy systems containing noble metals. More particularly, the invention relates to a process of recovering the valuable materials, such as rhenium, tantalum, hafnium and platinum contained in the precursors. Such precursors are encountered when processing the corresponding alloys, and also when comminuting scrap from used machine parts made of such alloys.

BACKGROUND OF THE INVENTION

For the recovery of valuable metals from alloy scrap, a range of oxidative metallurgical and hydrometallurgical processes have been developed, but all of them have predominantly the disadvantage of a high energy consumption (for example roasting at high temperatures) and/or require the use of environmentally unfriendly reagents.

A good summary of the various processes is provided by the publications Kenworthy et al., "Experimental Extraction of Strategic Components . . . ", Report of Investigations 5786, United States Department of the Interior, Bureau of Mines, 1976, and K. Vadasdi, "Effluent Free Manufacture of Ammonium Paratungstate (APT) by Recycling the Byproducts", Int. J. of Refractory Metals & Hard Materials 13 (1995) 45–59.

Also mentioned in these publications are, electrolytic processes for the decomposition of alloys For energy-related and ecological reasons, electrolytic processes are generally preferable to the other processes. The advantages of the electrolytic decomposition processes for scrap are generally due to the elegant and streamlined process control, which, with current efficiencies of around 100%, ensures low process costs and also constitutes a better choice in environmental terms.

The major disadvantage of the electrolysis processes becomes apparent when it is necessary to decompose scrap which is present in powder form, typically with particle sizes smaller than 1000 µm, with average particle sizes of from 10 to 500 µm and preferably up to 200 µm, with the particle sizes of as little as 1 µm being included. In addition to the fundamental problem of handling such powders in an electrolysis cell, bringing a powder particle into contact with the anode, other problems arise, in particular, that of susceptibility of such powders to surface passivation , which leads to almost complete termination of the anodic oxidation processes. Consequently, within short electrolysis times, an uneconomically high increase in the electrolysis voltage takes place, together with the breakdown of water. Although for the electrolysis of scrap in large pieces, it is possible to counteract such passivation effects by suitable measures involving the electrolyte composition, pH adjustment, and current polarity reversal (J. Electrochem. Soc. India, 1986, 35-2, 127), in the case of powder batches, however, boundary-layer effects with pronounced pH gradients owing to low electrolyte mobility have a dominant effect and terminate the intended reaction.

It was an object of the present invention, while taking economic aspects into account, to provide an electrolytic process for the decomposition of powders and an electrolysis cell which is suitable for the electrolysis of powders.

SUMMARY OF THE INVENTION

The invention relates to a process for the electrochemical decomposition of precursors in powder form by introducing a powder batch between two electrodes of an electrolysis cell, which is characterized in that the electrodes are designed to liquid-permeable, and the electrolyte flows through the powder batch perpendicularly to the electrode surfaces.

Advantageously, the electrolysis cell has, at least on the outflow side of the brine, an electrode structure which comprises, in the flow direction of the brine, an electrode plate provided with perforations, a liquid-permeable, preferably woven filter cloth, and a supporting pierced plate intended to support the filter cloth against the anode plate.

Advantageously, in order to ensure electrical contact with the anode, the powder batch lies or bears on the anode plate. In order to avoid a short-circuit, the cathode plate is insulated from the powder batch by a separator. A suitable separator is a fabric which is resistant to the electrolyte, for example a PTFE-based (polytetrafluoroethylene-based) fabric, or a perforated plate or sheet of electrolyteresistant material.

DETAILED DESCRIPTION OF THE INVENTION

Figure 1:
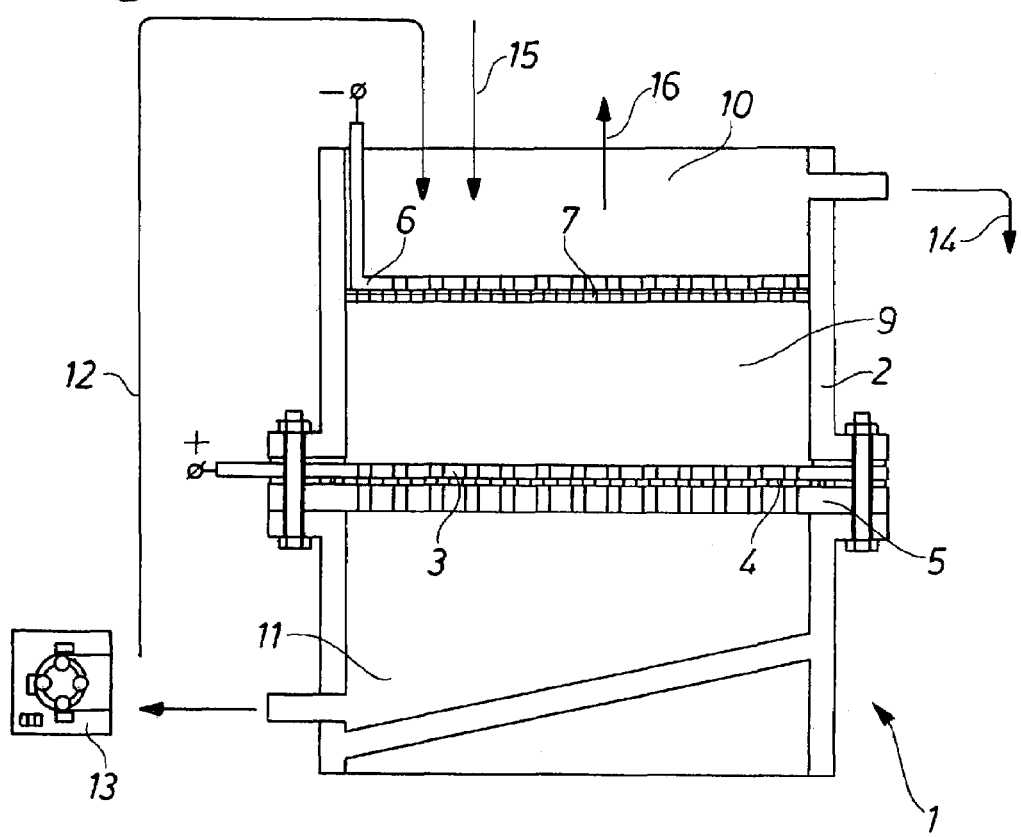
FIG. 1 shows an electrolysis cell 1 according to the invention, which consists of an electrically insulating cell housing 2 in which a horizontally arranged anode 3 provided with perforations is arranged. A filter cloth 4 bears against the anode 3, and is held against the anode 3 by a means of pierced support plate 5. The cathode 6, which has a separator 7 on its side facing the anode 3, is arranged vertically mobile inside the cell housing 2.

The invention is further described hereunder with particular reference to its present embodiments. According to one embodiment of the invention, the electrolyte flows through the electrolysis cell from the cathode to the anode, with the powder batch being pressed against the anode not only by gravity, but also by the liquid pressure which is necessary owing to the flow resistance.

According to another embodiment of the invention, the electrodes are arranged horizontally, with the cathode plate being fitted so as to be vertically mobile in the cell, and lying on the powder batch while being separated from it by the separator. In this case, the powder batch may, in order to ensure electrical contact with the anode plate and between the powder particles of the batch, exert pressure on the batch owing to the weight of the electrode plate or owing to additional forces exerted on the electrode plate, with a short-circuit being prevented by the separator arranged on the cell side of the cathode.

In the event that the cell is designed with a vertically mobile cathode, the electrode spacing is determined by the height of the powder batch, which decreases in the course of carrying out the electrochemical decomposition. An initial height of the powder batch of from 1 to 50 cm is preferred.

When the electrode spacing has fallen to less than 10% of the initial spacing, the cell is opened and again filled with a powder batch.

According to another embodiment of the invention, the electrolysis cell with horizontal electrodes has a fixed electrode spacing, with the powder to be decomposed being periodically or continuously dispersed in the electrolyte, and being fed into the cell by means of an insulated tube supply through the perforated electrode on the inflow side. This follows a continuous mode of operation.

According to another embodiment of the invention, the cell with horizontal electrodes has a vertically mobile electrode, by means of which pressure is exerted on the powder batch, discontinuously, for example every 10 to 50 hours. The electrode spacing is increased, and refilling is carried out by means of dispersion in the electrolyte through the perforated electrode on the inflow side, and the vertically mobile electrode is subsequently placed onto the powder batch which has been built up.

Advantageously, the electrolyte flows from top to bottom through the electrolysis cell with horizontal electrodes. It is likewise preferable for the lower electrode to be the anode, which has a filter cloth held by a pierced base on the outflow side.

The electrolyte is selected according to the powder composition to be decomposed. An aqueous alkali hydroxide solution will advantageously be used as the electrolyte, if the alloy powder comprises metals that form alkali metallates which are soluble in an aqueous alkaline medium in particular tungsten, molybdenum and/or rhenium and their alloys. Advantageously, an alkali hydroxide concentration of at least 0.1 mole per litre will be maintained. Particularly preferably, the alkali hydroxide concentration should be from 1 to 6 moles per litre. An aqueous inorganic acid, preferably hydrochloric acid, will advantageously be used as the electrolyte, in the event that superalloy powders based on the major alloy components nickel, cobalt and/or chromium are used as the powder to be decomposed, in particular those which furthermore contain valuable material components such as Hf, Ta, Nb, Mo, W, Re and/or platinum group metals.

The present invention furthermore relates to an electrolysis cell, comprising an electrically insulating housing and two liquid-permeable electrodes arranged in the housing, at least one of the electrodes having a structure which consists of a supporting pierced plate, an electrode plate provided with perforations, and a filter cloth arranged between the supporting pierced plate and the electrode plate, and the cathode is shielded from the cell interior by means of a liquid-permeable separator consisting of electrically non-conductive material; furthermore, a distribution chamber for the electrolyte is provided on the cathode side and a collection chamber for the electrolyte is provided on the anode side, a recirculation line routed outside the cell is provided between the collection chamber and the distribution chamber, and means for delivering the electrolyte through the recirculation line from the collection chamber to the distribution chamber are provided, and an external heat exchanger, which can be operated selectively in heating or cooling mode, can be interposed in the recirculation line.

Advantageously, the electrodes of the electrolysis cell are arranged horizontally above one another with a spacing between them, the anode forming the lower electrode and the cathode forming the upper electrode. It is furthermore preferable for the cathode to be arranged vertically mobile in the housing.

It is furthermore preferable to provide means for removing some of the electrolysis brine, and for supplying fresh electrolyte, in the distribution chamber, the collection line and/or the recirculation line. The distribution chamber furthermore has means for drawing off electrolytically evolved gases, in particular hydrogen.

The invention will be explained in more detail with reference to FIG. 1 below: FIG. 1 shows an electrolysis cell 1 according to the invention, which consists of an electrically insulating housing 2 in which a horizontally arranged anode 3 provided with perforations is arranged. A filter cloth 4 bears against the anode 3, and it is held against the anode 3 by a means of pierced support plate 5. The cathode 6, which has a separator 7 on its side facing the anode 3, is arranged vertically mobile inside the cell housing 2. The spacing between the anode 3 and the cathode 6 is determined by the height of the powder batch 9 between the electrodes. The distribution chamber 10 for the electrolyte is located above the cathode 6. The collection chamber 11 for the electrolysis brine is located below the anode 3. The brine is pumped through the recirculation line 12 by means of a schematically indicated hose pump 13. Optionally, a storage container operated under reduced pressure (vacuum) may be connected upstream, from which the electrolyte can be fed back to the cell, while being regulated according to the filling level, using a suitable pump. Some of the electrolyte brine is continuously or periodically removed via 14 and replaced by fresh electrolyte, as indicated by the arrow 15. Hydrogen 16 evolved at the cathode 6 furthermore escapes from the distribution chamber 10, which is shown here as being open. In another embodiment of the operation of the cell according to the invention, the electrolyte is made to flow upwards against the anode from below, and the electrolyte may then advantageously be taken from a free overflow above the cathode of the cell and fed back into the circuit.

The invention is further illustrated but is not intended to be limited by the following examples in which all parts and percentages are by weight unless otherwise specified.

EXAMPLES

Example 1

In electrolysis equipment according to the invention and corresponding to FIG. 1, with a circular base area of 154 cm$^2$, 3059 g of Re/W scrap (3% Re, 97% W, average particle size approximately 100 μm) in powder form are poured onto a perforated metal plate (for example Ni) connected as the anode; the surface of the powder is covered first with a separator and then with a cathodically connected, likewise perforated, vertically mobile metal plate which is lowered by its own weight. A filter cloth, which in turn rests on a pierced base for stabilization, is stretched below the anodic metal plate. This basic equipment combines both the function of an electrolysis cell and also the function of a filter component, and it will be referred to below overall as a filtration electrolysis cell. The filtration electrolysis cell is provided with an internal circuit, in which the alkaline electrolyte is sucked through the powder bed with a circulation volume of 40 ml/h·cm$^2$ by means of a pump. A direct current is set and regulated at 20 A between the anode and the cathode, and electrolysis is carried out for 125 h. During the electrolysis, the voltage is in the range of from 2.8 V (start)–3.1 V (end), an electrolysis temperature of from 30 to 35° C. being set. Every hour, 210 ml of a sodium hydroxide solution containing 100 g/l are added to the electrolysis system, and about 210 ml of product liquor (105 g/l W and 3.5 g/l Re) are taken out via an overflow. After the end of the electrolysis, the remaining cell content is washed, dried and weighed: the quantity of dissolved powder scrap is found to be 2845 g, which corresponds to a Faradic current efficiency of 100%. The energy consumption per kg of dissolved powder scrap is between 2.46 and 2.72 kWh, depending on the voltage.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the electrochemical decomposition and purification of metal precursors in powder form comprising:
   (a) introducing a powder batch comprising metal precursors between two electrodes of an electrolysis cell, each of said electrodes having a surface and being liquid-permeable;
   (b) passing, perpendicularly to said electrode surfaces, an electrolyte through said powder batch;
   (c) applying an electrical current across said electrodes;
   (d) forming, electrolytically, a product liquor comprising dissolved metal and said electrolyte;
   (e) passing said product liquor through one of said electrodes;
   (f) retaining undisolved material from said powder batch between said electrodes; and
   (g) recovering purified metal from said product liquor.

2. The process of claim 1, wherein said electrolysis cell further comprises a pumping circuit, the electrolyte is pumped or sucked through the powder batch, and, partially removed from the pumping circuit and replaced by a fresh electrolyte, in order to maintain an effective brine composition.

3. The process of claim 1, wherein the electrolytic cell has a brine outflow side, said electrolytic cell further comprising at least on said brine outflow side an arrangement consisting of,
   (i) a supporting pierced plate,
   (ii) an electrode plate provided with perforations, and
   (iii) a filter cloth arranged between the supporting pierced plate and the anode plate.

4. The process of claim 1, wherein said electrolysis cell further comprises a cathode plate, said cathode plate being insulated from the powder batch by a separator.

5. The process of claim 1, wherein said electrolysis cell comprises a housing, one of said electrodes is a cathode and one of said electrodes is an anode, the electrodes are arranged horizontally, the cathode is filled so as to be vertically mobile in the housing, and the electrode spacing is determined by the height of the powder batch.

6. The process of claim 5, wherein the powder batch is pressed against the anode by the weight of the cathode in order to make the electrical contact with the anode.

7. The process of claim 1, wherein the powder batch comprises metals that form alkali metallates which are soluble in an aqueous alkaline medium, and said electrolyte comprises an aqueous alkali hydroxide solution.

8. The process of claim 7, wherein the powder batch comprises metals selected from the group consisting of W, Mo, Re and their alloys.

9. The process of claim 7, wherein said electrolyte has an alkali hydroxide concentration of at least 0.1 mol/l.

10. The process of claim 9, wherein said electrolyte has an alkali hydroxide concentration of from 1 to 6 mol/l.

11. The process of claim 7, wherein one of said electrodes is a cathode and one of said electrodes is an anode, and said electrolyte flows from the cathode to the anode.

12. The process of claim 1, wherein the powder batch comprises superalloys, and said electrolyte comprises an aqueous inorganic acid.

13. The process of claim 12, wherein the superalloys comprise as a major alloy constituent selected from the group consisting of Ni, Co and Cr.

14. The process of claim 13, wherein the superalloys further comprise a metal selected from the group consisting of Hf, Ta, Nb, Mo, W, Re and platinum group metals.

* * * * *